United States Patent [19]
Ito et al.

[11] Patent Number: 4,697,886
[45] Date of Patent: Oct. 6, 1987

[54] COLOR LIQUID CRYSTAL DISPLAY DEVICE WITH INTERDIGITED SEGMENT ELECTRODES

[75] Inventors: Hiroshi Ito, Katsuta; Masaru Kugo, Ibaraki; Sizuhisa Watanate, Katsuta, all of Japan

[73] Assignees: Hitachi, Ltd., Tokyo; Hitachi Automotive Engineering Co., Ltd., Ibaraki, both of Japan

[21] Appl. No.: 916,698

[22] Filed: Oct. 8, 1986

[30] Foreign Application Priority Data

Oct. 9, 1985 [JP] Japan .................. 60-223627
Dec. 11, 1985 [JP] Japan .................. 60-276821

[51] Int. Cl.$^4$ .............................. G02F 1/13
[52] U.S. Cl. ...................... 350/336; 350/339 F
[58] Field of Search .......... 350/339 F, 336, 347 V

[56] References Cited

U.S. PATENT DOCUMENTS 4,579,424  4/1986  Matsukawa et al. ....... 350/339 F X

FOREIGN PATENT DOCUMENTS 760824   8/1976  Canada ................. 350/336
54-36750  3/1979  Japan ................. 350/336
59-222877 12/1984 Japan .
60-260921 12/1985 Japan ................. 350/336

Primary Examiner—John K. Corbin
Assistant Examiner—Richard F. Gallivan
Attorney, Agent, or Firm—Antonelli, Terry & Wands

[57] ABSTRACT

This invention discloses a color liquid crystal display device which can be applied to 7-segment numeric display, for example, A pair of transparent electrodes are disposed on the inner surfaces of a pair of transparent substrates facing each other. One of the transparent electrodes has a function as the display segments and is constituted by two comb tooth-like electrodes that are fixed in a predetermined direction. The direction of teeth of these two comb tooth-like electrodes is in agreement with each other. The other of the transparent electrodes has a flat sheet-like shape. Color filters of two colors are alternately disposed on the two comb tooth-like electrodes in such a manner as to face the other of the transparent electrodes. The direction of disposition of the color filters is in agreement with the direction of the teeth of the comb tooth-like electrodes. The color filters are disposed on the entire surface of the display range including the display segment. A liquid crystal is sealed between the color filters and the other of the transparent electrodes. A voltage is applied across the pair of the transparent electrodes and controls the transmission quantity of the liquid crystal. Thus, segment display can be effected.

6 Claims, 9 Drawing Figures

4,697,886

COLOR LIQUID CRYSTAL DISPLAY DEVICE WITH INTERDIGITED SEGMENT ELECTRODES

FIELD OF THE INVENTION

This invention relates to a liquid crystal display device, and more particularly to a color liquid crystal display device suitable for 7-segment numeric display.

BACKGROUND OF THE INVENTION

In color liquid crystal display devices of the type in which color filters are formed on matrix electrodes, a liquid crystal television having comb tooth-like electrodes in the unit pixel of image display is disclosed, for example in Japanese Patent Laid-Open No. 222877/1984. Since the color liquid crystal display devices use matrix electrodes, a voltage in either an X direction or a Y direction is applied to those portions which are not turned on, so that these turn-off portions look as if they were turned on, depending upon an angle of view.

SUMMARY OF THE INVENTION

It is a primary object of the present invention to provide a color display device having excellent visibility by improving contrast.

The present invention relates to a color liquid crystal display device having color filters on the surface of comb tooth-like electrodes. In accordance with the present invention, two comb tooth-like electrodes which are fixed in either X direction or Y direction are formed for each segment for 7-segment numeric display, for example, and the color filters are uniformly formed on the entire surface of a display range in agreement with the direction of the comb tooth-like electrodes. More in detail, the direction of the teeth of the comb tooth-like segment electrodes is in agreement with the direction of disposition of the color filters and moreover, the color filters are disposed on the entire surface of the display range. If the color filters are disposed on only the segment electrodes, the turn-off segment electrode portions look as if they were turned on. To solve this problem, the present invention disposes a dummy filter on the entire surface of the display range and thus provides a color liquid crystal display device having high contrast and excellent visibility.

DETAILED DESCRIPTION OF THE PREFERRED EMBODIMENTS

Figure 2:
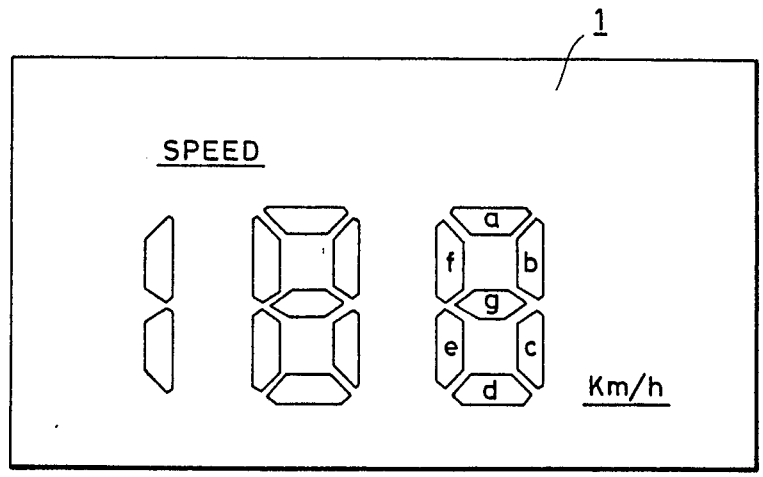
FIG. 2 is a schematic view showing a display example of a liquid crystal display device to which the present invention is applied.

In the accompanying drawings, FIG. 2 shows an example of the display content of a speed indicator using a liquid crystal display device. The numeric unit consists of seven segments, which are hereby called "a, b, c, d, e, f and g segments".

Figure 1:
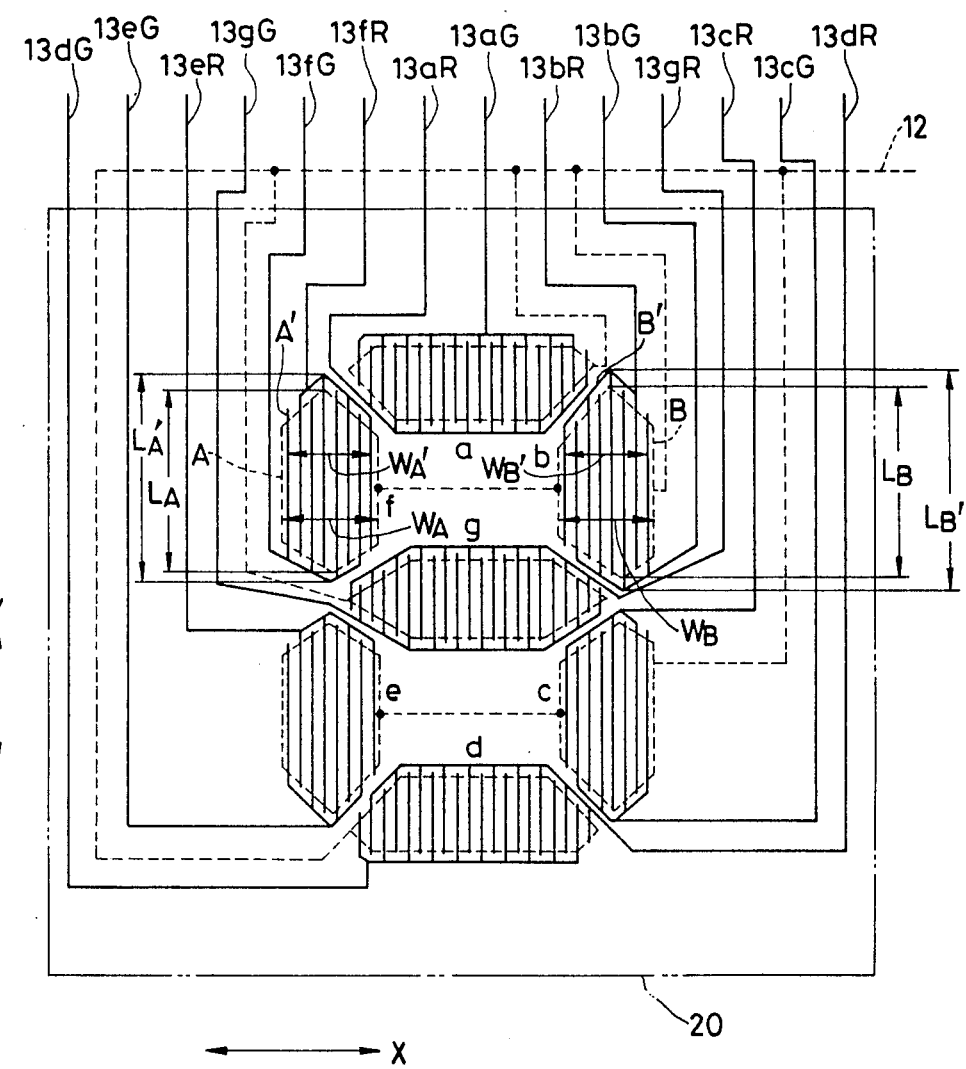
FIG. 1 is a plan view showing the relation of patterns between upper and lower electrodes and also a display plate as a whole.
Figure 3:
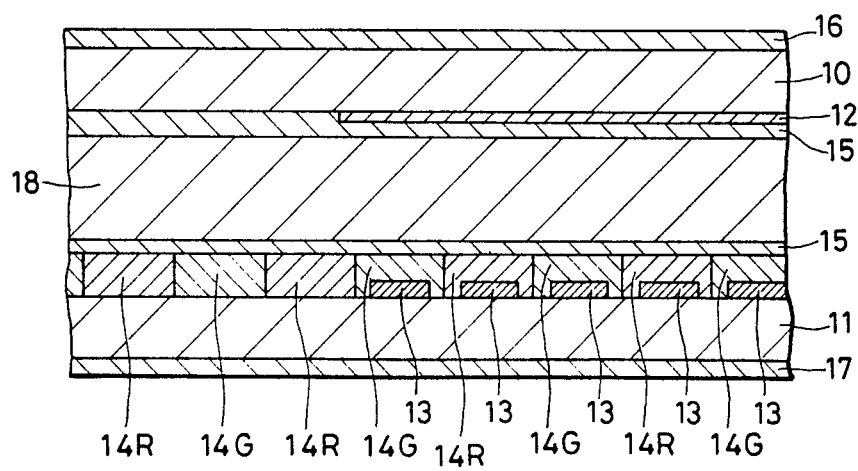
FIG. 3 is an enlarged sectional view of the principal portions of the liquid crystal display device in accordance with one embodiment of the present invention.

Referring to FIG. 3, segment display electrodes 13 are disposed on a glass substrate 11 of a lower plate, and color filters such as red and green filters 14R and 14G are alternately formed on the segment display electrodes 13. On the other hand, a flat electrode 12 is disposed on the lower surface of a glass substrate 10 of an upper plate that faces the lower plate glass substrate 11. The flat electrode 12 has a 7-segment shape such as shown in FIG. 1. Orientation control films 15 are formed on the color filters 14R, 14G and the flat electrode 12 in order to orient the liquid crystal molecules in a certain predetermined direction, and a liquid crystal material 18 is sealed between them. A lower plate polarizer 17 is disposed by an adhesive outside the lower plate glass substrate 11 while an upper plate polarizer 16 is disposed by an adhesive outside the upper plate glass substrate 10.

When a square wave voltage is applied to each of the flat and segment display electrodes 12, 13, the liquid crystal 18 at the portions where the flat electrode 12 and the segment display electrodes 13 overlap with one another moves so that each color of the color filters 14 can be seen through. Here, three colors, that is, the color of the filter itself, monochrome and their intermediate color, can be displayed by selecting a voltage to be applied to the segment display electrode 13.

In order to obtain higher contrast and to improve visibility, further, the present invention employs an electrode pattern construction such as shown in FIG. 1. In FIG. 1, the pattern represented by solid line indicates the segment display electrode 13 and the pattern represented by dash line does the flat electrode 12.

Figure 5:
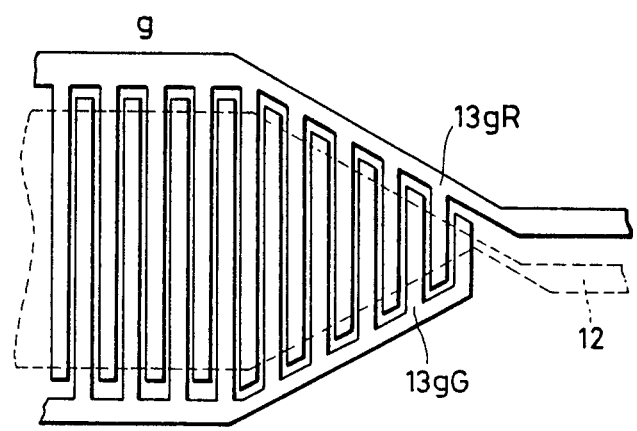
FIG. 5 is an explanatory view useful for explaining the relation of transparent electrodes in the present invention.

The segments a, b, c, d, e, f and g are formed on the segment display electrode 13 by comb tooth-like electrodes that are all coordinated in a longitudinal direction with respect to a display segment. FIG. 5 is a partial enlarged view of the g segment. Incidentally, for the sake of convenience of forming the color filter, the comb toothlike electrode corresponding to the same color in each segment is positioned on the same line in a stripe direction. In other words, the comb tooth-like electrode of the a segment corresponding to R, for example, is disposed on the same line in the longitudinal direction as the comb tooth-like electrodes of the b, c, d, e, f and g segments corresponding to R.

Since the pattern display of the liquid crystal display device by the application of the voltage to the electrodes 12, 13 is effected by the peripheral portion of the flat electrode 12, which does not make segment display, rather than the segment display electrode 13, it is generally effective if the occupying area of the flat electrode 12 than the occupying area of the segment display electrode 13 which includes the gap portion between 13gR and 13gG as shown in FIG. 5.

The flat electrode 12 represented by dash line in FIG. 1 defines the shape of the 7-segment display pattern. As to the b and f segments and the c and e segments whose longitudinal direction is in agreement with the stripe direction, the segments are connected with one another inside the 7-segment. As to the other segments that can be formed in a size greater than the display segments, that is, the a, d and g segments, either one of the end portions of each segment in its longitudinal direction is used as an extension portion for mutual connection of the electrodes. The extension patterns are connected integrally inside an effective display range 20 as the liquid crystal display device (inside one-dot-chain line in FIG. 1) and moreover, while the wiring of the extension pattern of the segment display electrode 13 is outside the effective display range 20 when the lower plate glass substrate and the upper plate glass substrate are superposed with each other.

The connection arrangement described above can prevent turn-on of the turn-off portions due to the crossing of the wirings of the extension patterns of the upper and lower transparent electrodes other than the turn-on shape portions within the effective display range, and can reduce and simplify the wirings.

When a plurality of flat electrodes A, B facing one another in the X direction are connected in the shortest distance as shown in FIG. 1, it is advantages for the wiring arrangement to employ the relation $W_A$, $W_B > W_A'$, $W_B'$ where A', B' are segment electrodes facing the flat electrodes A, B and $W_A'$ and $W_B'$ are the width of the segment electrodes A' and B', respectively. From the aspect of the relation of the areas between the flat electrode and the segment display electrode described already and for the determination of the display pattern, it is advantageous to employ the relation $L_A'$, $L_B' > L_A$, $L_B$ where $L_A$ and $L_B$ are the length of $W_A$ and $W_B$ in the Y direction and $L_A'$ and $L_B'$ are the length of $W_A'$ and $W_B'$ in the Y direction.

In accordance with the present invention, the display unit can be driven completely statically and display having high visibility without any dependence on the angle of view can be accomplished.

Figure 4:
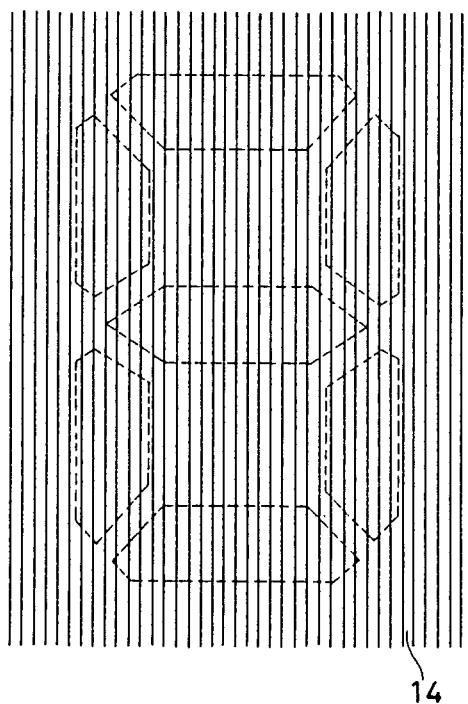
FIG. 4 is an enlarged view of the principal portions and is useful for explaining the relation between the electrode patterns shown in FIG. 1 and a color filter.

FIG. 4 shows the case where a color filters 14 are formed on the electrode pattern shown in FIG. 1. The red and green stripe-like color filters are alternately formed in the longitudinal direction which is the same direction of the comb tooth-like electrode pattern, and uniformly over the entire surface of the effective display range.

According to this embodiment, the entire surface of the effective display range becomes uniform and since the color arrangement of the turn-off segment portion is exactly the same as that of the portions outside the display unit, display having high visibility can be provided.

Figure 6:
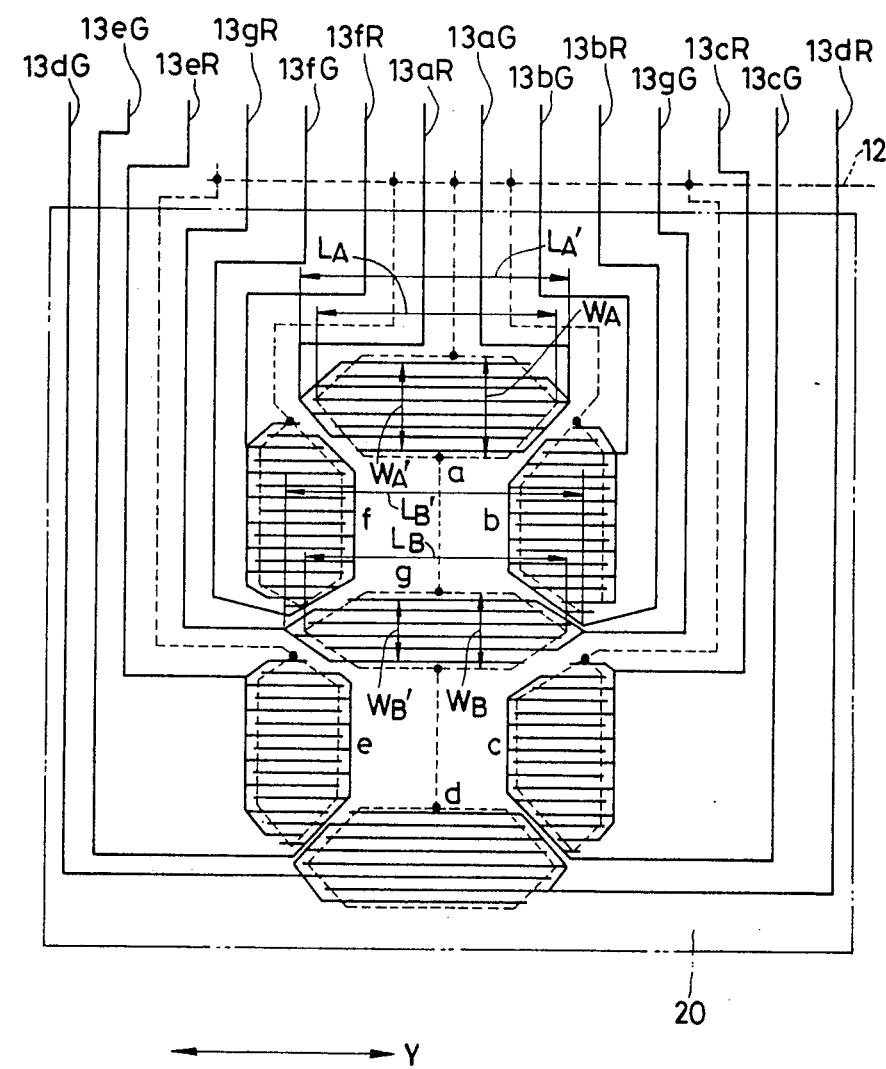
FIG. 6 is a plan view showing the electrode pattern in another embodiment of the present invention.
Figure 7:
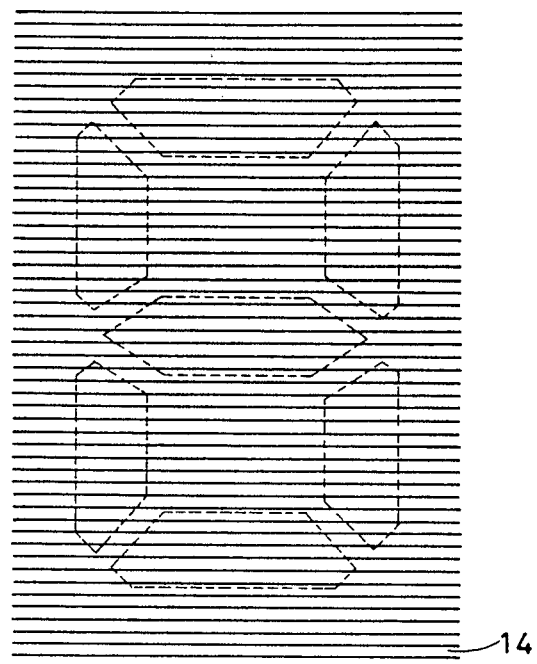
FIG. 7 is an enlarged view of the principal portions and is useful for explaining the relation between the electrode pattern shown in FIG. 6 and the color filter.

FIG. 6 shows the case where the stripe direction of the comb tooth-like electrodes is transverse with respect to the display segments. In this case, all the segment display electrodes 13 are in the transverse direction. As to the condition of formation of the terminal portions, the shape of the terminal portions of the b, c, e and f segments in FIG. 1 corresponds to the a, d and g segments in FIG. 6, and the end portion of each segment is formed in the transverse direction. The shapes of the terminal portions of the a, d and g segments in FIG. 1 correspond to those of the b, c, e and g segments and are formed by the periphery of one side of each segment. Though the flat electrode 12 is connected to the b and f segments and the c and e segments in FIG. 1, the three segments, i.e., a, g and d, are connected this time, and the extension portions of the b, c, e and f segments are disposed at one of the end portions in the longitudinal direction relative to the display segment. FIG. 7 shows the case where color filters 14 are formed on the electrode pattern shown in FIG. 6. In the same way as in FIG. 5, the two stripe-like color filters are formed alternately and uniformly in the transverse direction with respect to the display segment.

In a color liquid display device consisting of comb tooth-like electrodes and color filters corresponding to the electrodes, the present invention can drive the display device completely statically, can eliminate the occurrence of turn-on of the electrode patterns other than the pattern of the turn-on portions, and can provide a color liquid crystal display device having high visibility due to the improvement in contrast.

Figure 8:
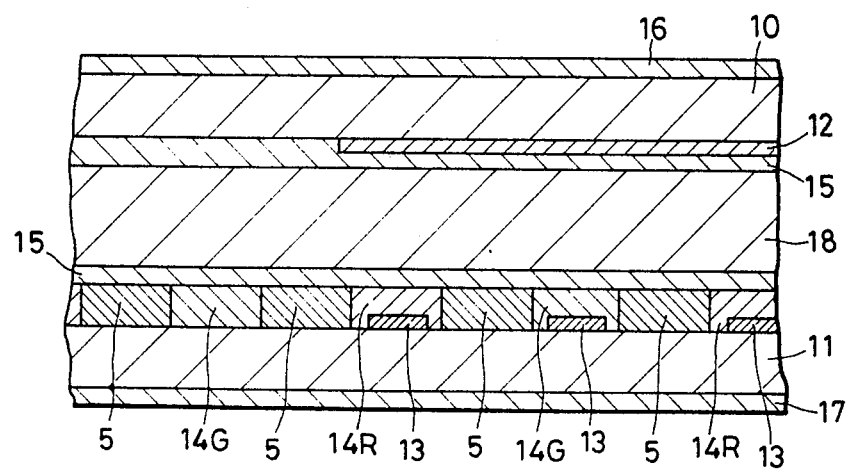
FIG. 8 is an enlarged sectional view of the principal portions of the liquid crystal display device in accordance with still another embodiment of the present invention.

In FIG. 8, a segment display electrode 13 is shown disposed on the lower plate glass substrate 11, and stripe-like color filter layers 14R, 14G for producing display colors such as red and green are alternately formed on the segment display electrode 13. Besides the color filters 14R, 14G formed on the segment display electrode 13, a stripe-like color filter layer 5 for controlling the background color of the liquid crystal display device 1 is disposed between the color filters 14R and 14G, for example. Since it is not associated with the turn-on segments, the color filter 5 is formed in a range other than the segment display electrode 13. An arbitrary color is used for the color filter 5 so that the desired background color of the liquid crystal display device 1 is determined by the combination of the color filters 14R and 14G for producing the turn-on colors. In this embodiment, since the turn-on colors are red and green, the color of the color filter 5 determining the background color is blue. In this case, the background color by the combination of these solors is substantially approximate to white.

On the other hand, the flat electrode 7 is disposed on the upper plate glass substrate 10 in such a manner as to face the lower plate glass substrate 11. The flat electrode 7 has the same of the turn-on segment shown in FIG. 2. Orientation control films 15 for orienting the liquid crystal molecules in a certain predetermined direction are formed on the color filters 14R, 14G, on 5 and on the flat electrode 12, respectively, and a liquid crystal material is sealed between these members. The lower plate polarizer 17 is bonded outside the lower plate glass substrate 11 while the upper plate polarizer 16 is bonded outside the upper plate glass substrate 10.

When a square wave voltage is applied to each of the segment display and flat electrodes 13, 12, the liquid crystal existing between the mutually overlapping electrodes operates and the color of each color filter 14R, 14G can be seen through. On the other hand, the liquid crystal 18 at the other portions is inoperative and can be seen through as the background color other than the color of the turn-on display shape.

Figure 9:
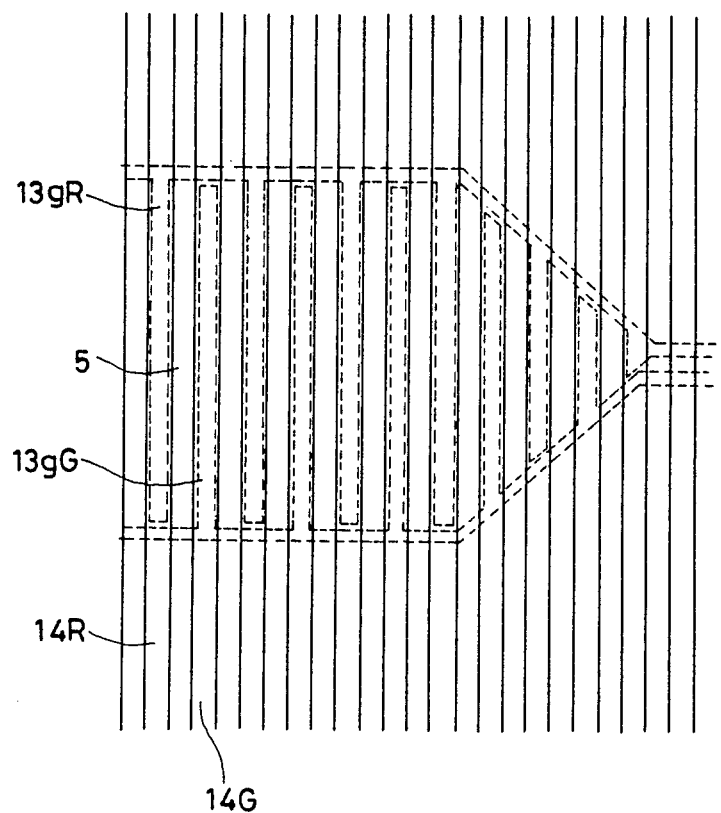
FIG. 9 is a partial, enlarged plan view of the liquid crystal display device shown in FIG. 9.

FIG. 9 is a schematic view when the construction of the present invention is viewed from the side of the liquid crystal display surface. This drawing is a partial enlarged view of the g segment shown in FIG. 1. Dash line represents the segment display electrode 13 on the lower plate side. The portion colored by the red filter layer 14R is 13gR and the portion colored by the green filter layer 14G is 13gG. The blue filter layer 5 is formed between the comb tooth-like electrodes 13gR and 13gG.

Since the red filter layer 13R, the green filter layer 13G and the blue filter layer 5 are formed on the entire surface of the liquid crystal display device 1 shown in FIG. 2, the mixed color synthesized by these filter colors is the background color of the liquid crystal display device 1.

In accordance with this embodiment, the color filter layer for determining the background color can be formed in addition to the transparent electrodes associated with turn-on so that the tone of the background color can be expressed freely in accordance with a customer's need.

Incidentally, the color filter layer 5 for determining the background color need not always be disposed between the red filter layer 14R and the green filter layer 14G. For example, the color filter layer 5 may be disposed in the sequence of the red filter layer 14R, the green filter layer 14G and then the background color filter layer 5.

The present invention can accomplish a color liquid display device which can arbitrarily change the background color in accordance with a customer's need and has high visibility.

What is claimed is:

1. In a color liquid crystal display device of the type which includes a pair of transparent substrates facing each other in parallel, a pair of transparent electrodes formed on the opposed inner surface sides of said transparent substrates, color filters formed on one of said transparent electrodes in such a manner as to face the other of said transparent electrodes and a liquid crystal interposed between said color filters and the other of said transparent electrodes, and in which a voltage is applied to the pair of said transparent electrodes and color display is effected by controlling the transmission quantity of said liquid crystal, the improvement wherein:

One of said transparent electrodes is disposed as display segments at part inside the full display range of said color liquid crystal display device occupied by said transparent electrodes;

said display segment consists of two sets of comb tooth-like electrodes which are controlled independently of each other and are disposed in such a manner that their comb portions are in engagement with one another; and the direction of comb teeth of said comb tooth-like electrodes of all of said display segments are arranged in the same direction.

2. The color liquid crystal display device as defined in claim 1 wherein said electrode on the side where said display segments are not disposed is shaped in a flat plate form in conformity with the shape of the display pattern of said display segments, and said electrodes on the side where said segments are not disposed are commonly wired outside said display range.

3. The color liquid crystal display device as defined in claim 1 wherein, when a plurality of electrodes A, B facing one another on the side where said segments are not disposed are wired with one another in the shortest distance, the width $W_A$, $W_B$ of said electrodes A, B in an X direction is greater than the width $W_A'$, $W_B'$ of electrodes A', B' on the side of said segments, which face said electrodes A, B, in the X direction, and the length $L_A$, $L_B$ of said electrodes A, B in a Y direction crossing said X direction at right angles is smaller than the length $L_A'$, $L_B'$ of said electrodes A', B' in said Y direction.

4. The color liquid crystal display device as defined in claim 1 wherein two stripe-like color filter layers are alternately arranged as said color filters in the same direction as the pattern of said comb tooth-like electrodes.

5. The color liquid crystal display device as defined in claim 4 wherein said color filters are formed in such a manner as to cover the entire surface of said display range.

6. The color liquid crystal display device as defined in claim 4 wherein a stripe-like color filter having a color different from the colors of said two color filters is disposed separately in the proximity of said stripe-like color filters and within a display range which is not subjected to direct turn-on display control by a control electrode for controlling said comb tooth-like electrodes and a flat sheetlike electrode facing said comb tooth-like electrodes, and said separate color filter determines the background color of portions other than the portion which is directly displayed by said electrodes inside said display range.

* * * * *